US012605826B2

(12) United States Patent
Sugishita

(10) Patent No.: US 12,605,826 B2
(45) Date of Patent: Apr. 21, 2026

(54) BEARING, SPEED REDUCER, AND ROBOT

(71) Applicant: NIDEC DRIVE TECHNOLOGY CORPORATION, Muko (JP)

(72) Inventor: Kenji Sugishita, Muko (JP)

(73) Assignee: NIDEC DRIVE TECHNOLOGY CORPORATION, Kyoto (JP)

( * ) Notice: Subject to any disclaimer, the term of this patent is extended or adjusted under 35 U.S.C. 154(b) by 149 days.

(21) Appl. No.: 18/586,633

(22) Filed: Feb. 26, 2024

(65) Prior Publication Data

US 2024/0286274 A1    Aug. 29, 2024

(30) Foreign Application Priority Data

Feb. 27, 2023    (JP) ................................. 2023-028693

(51) Int. Cl.
*F16C 19/16*        (2006.01)
*B25J 9/10*        (2006.01)
        (Continued)

(52) U.S. Cl.
CPC ............. B25J 9/108 (2013.01); F16C 19/163 (2013.01); F16C 33/3806 (2013.01);
        (Continued)

(58) Field of Classification Search
CPC ............... F16C 19/163; F16C 33/3806; F16C 33/3843; F16C 33/385; F16C 33/3856; F16C 33/3887; F16C 2322/59; F16C 2362/62; F16H 1/32; F16H 2057/085; B25J 9/108

See application file for complete search history.

(56) References Cited

U.S. PATENT DOCUMENTS 6,957,919 B2 * 10/2005 Kern ..................... F16C 19/505
                                                384/510
9,228,612 B2    1/2016 Okamoto et al.
        (Continued)

FOREIGN PATENT DOCUMENTS

DE        3307845 A1 *  9/1984
DE    102010062479 A1    6/2012
        (Continued)

OTHER PUBLICATIONS

Official Communication issued in corresponding European Patent Application No. 24159692.3, mailed on Jul. 5, 2024, 12 pages.

*Primary Examiner* — Phillip A Johnson
(74) *Attorney, Agent, or Firm* — Keating & Bennett, LLP

(57)        ABSTRACT

A bearing includes an inner ring, an outer ring, an annular retainer, and rollers. The inner ring is located radially outside a central axis. The outer ring is located radially outside the inner ring. The retainer is located between the inner ring and the outer ring. The rollers are positioned at intervals in the circumferential direction by the retainer between the inner ring and the outer ring. The retainer includes column portions and a flange portion. The column portions are located between adjacent pairs of the rollers. The flange portion connects end portions on one axial side of the column portions in the circumferential direction. The flange portion extends radially inside from an end portion on one axial side of the column portions. The radial center of the column portions is located radially outside the radial center of the roller.

20 Claims, 7 Drawing Sheets

(51) Int. Cl.

| | | |
|---|---|---|
| *F16C 19/54* | (2006.01) | |
| *F16C 33/38* | (2006.01) | |
| *F16H 1/32* | (2006.01) | |
| *F16H 57/08* | (2006.01) | |

(52) U.S. Cl.

CPC ...... *F16C 33/3856* (2013.01); *F16C 33/3887* (2013.01); *F16H 1/32* (2013.01); *F16C 19/548* (2013.01); *F16C 2322/59* (2013.01); *F16C 2361/61* (2013.01); *F16H 2057/085* (2013.01)

(56) References Cited

U.S. PATENT DOCUMENTS

| | | | |
|---|---|---|---|
| 10,012,266 B1 * | 7/2018 | Moratz | ................. F16C 33/583 |
| 2012/0155794 A1 | 6/2012 | Ghilbert-Simon et al. | |
| 2018/0283518 A1 | 10/2018 | Kataoka | |
| 2020/0408260 A1 | 12/2020 | Kojima et al. | |

FOREIGN PATENT DOCUMENTS

| | | | | |
|---|---|---|---|---|
| DE | 102020116724 A1 | 12/2020 | | |
| EP | 3 173 645 B1 | 2/2019 | | |
| FR | 2 993 617 A1 | 1/2014 | | |
| JP | H11270563 A * | 10/1999 | ......... | F16C 33/3806 |
| JP | 5227144 B2 | 7/2013 | | |
| JP | 2021-004659 A | 1/2021 | | |
| WO | WO-2020080061 A1 * | 4/2020 | ......... | F16C 33/3887 |

* cited by examiner

BEARING, SPEED REDUCER, AND ROBOT

CROSS-REFERENCE TO RELATED APPLICATIONS

The present application claims priority under 35 U.S.C. § 119 to Japanese Patent Application No. 2023-028693, filed on Feb. 27, 2023, the entire contents of which are hereby incorporated herein by reference.

1. Field of the Invention

The present disclosure relates to bearings, speed reducers, and robots.

2. Background

In recent years, a demand for a speed reducer mounted on a joint of a robot and the like is rapidly increased. In addition to the demand for speed reducers, the demand for bearings used in speed reducers is also increasing. As the bearing, for example, an angular ball bearing is used from the viewpoint of improving durability.

A conventional bearing includes an outer member in which arc-shaped double-row outer rolling surfaces are formed on an inner periphery, a pair of inner rings in which arc-shaped inner rolling surfaces facing the double-row outer rolling surfaces are formed on an outer periphery, double-row rollers accommodated between the rolling surfaces, and a retainer that rollably holds the rollers. The retainer includes a pocket on an inner side concave spherical surface of the annular retainer body. The pocket is formed such that the dimension of the opening is smaller than the outer diameter of the roller. Then, the opening is elastically deformed to mount the roller, and the roller is encapsulated via a predetermined pocket gap.

Under such circumstances, it is recently required to further improve the rigidity of the bearing. Therefore, in the bearing, it is conceivable to improve the rigidity of the bearing by providing more rollers while reducing the diameters of the rollers. However, in this case, the gap between the adjacent rollers is also reduced. For this reason, in the retainer for holding the rollers, it is necessary to narrow a portion located in the gap between the adjacent rollers. In this case, there is a possibility that the strength of the retainer cannot be sufficiently secured at the time of manufacturing and using the bearing.

SUMMARY

An example embodiment of the present disclosure provides a bearing including an inner ring located radially outside a central axis, an outer ring located radially outside the inner ring, an annular retainer located between the inner ring and the outer ring, and rollers positioned at intervals in a circumferential direction by the retainer between the inner ring and the outer ring. The retainer includes column portions located between adjacent pairs of the rollers, and a flange portion connecting end portions on one axial side of the column portions in a circumferential direction. The flange portion extends radially inside from an end portion on one axial side of the column portion. Radial centers of the column portions are located radially outside radial centers of the rollers in a transverse plane passing through the radial center of the rollers and orthogonal to the central axis. Another axial end of the flange portion is located on another axial side with respect to one axial end of the rollers.

The above and other elements, features, steps, characteristics and advantages of the present disclosure will become more apparent from the following detailed description of the example embodiments with reference to the attached drawings.

DETAILED DESCRIPTION

Figure 1:
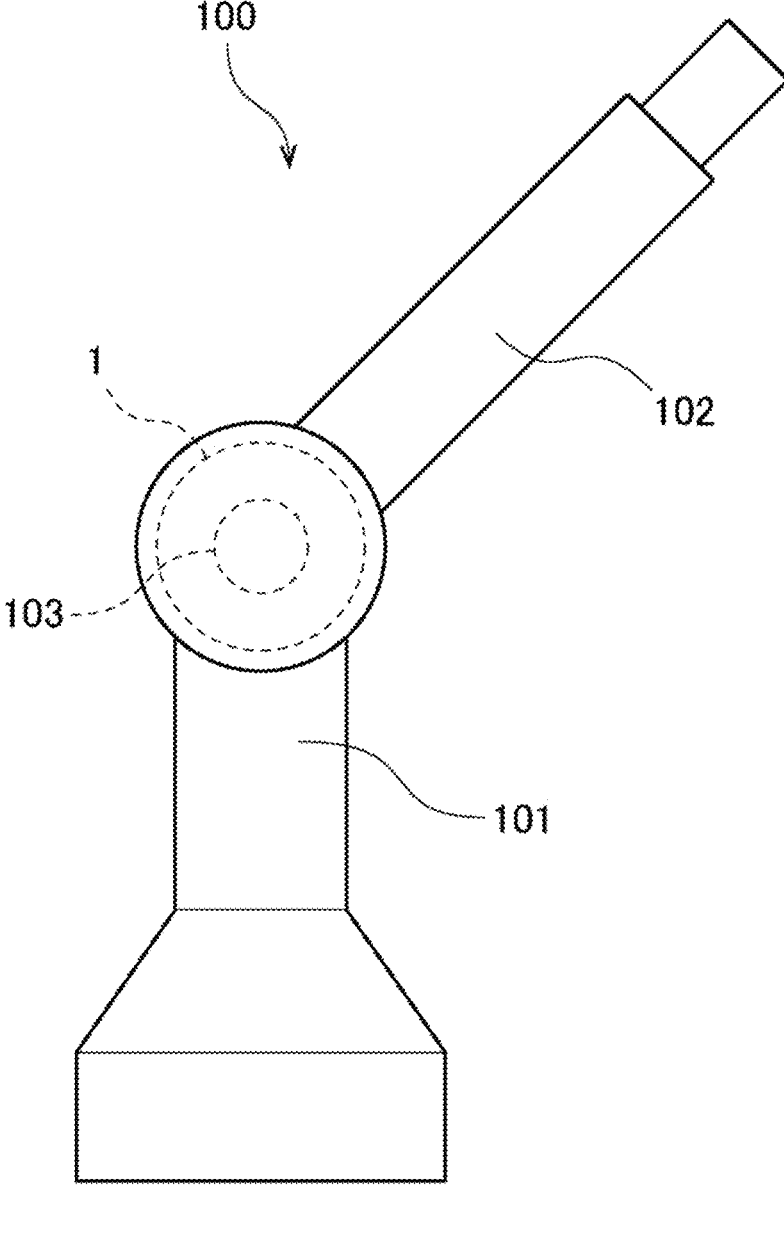
FIG. 1 is a schematic view of a robot according to an example embodiment of the present disclosure.

Hereinafter, example embodiments of the present disclosure will be described with reference to the drawings. Note that the components described in the following example embodiments are merely examples, and the scope of the present disclosure is not intended to be limited thereto. In addition, in the drawings, the dimensions and the number of elements may be exaggerated or simplified as necessary.

FIG. 1 is a schematic view of a robot 100 equipped with a speed reducer 1 according to a first example embodiment. For example, the robot 100 is what is called an industrial robot that performs works such as conveyance, processing, and assembly of components in a manufacturing line of an industrial product. As illustrated in FIG. 1, the robot 100 includes the speed reducer 1. As a result, it is possible to provide the robot 100 equipped with the speed reducer 1 having a bearing 85, which can increase the number of rollers 44 to increase the rigidity and secure the thickness of a column portion 431 located at the interval between the adjacent rollers 44 in a retainer 43 holding the rollers 44 by the mechanism described later. In the present example embodiment, the robot 100 includes a base frame 101, an arm 102, a motor 103, and the speed reducer 1.

The arm 102 is pivotally supported with respect to the base frame 101. The motor 103 and the speed reducer 1 are incorporated in a joint between the base frame 101 and the arm 102. When a drive current is supplied to the motor 103, a rotational motion is output from the motor 103. In addition, the rotational motion output from the motor 103 is decelerated by the speed reducer 1 and transmitted to the arm 102. Due to this, the arm 102 pivots with respect to the base frame 101 at a speed after deceleration.

Next, the entire configuration of the speed reducer 1 will be described.

Hereinafter, a direction parallel to a central axis of the speed reducer to be described is referred to as "axial direction", a direction orthogonal to the central axis of the speed reducer is referred to as "first radial direction", and a direction along an arc about the central axis of the speed reducer is referred to as "circumferential direction". In addition, in FIGS. 3 to 7 described later, the "first radial direction" is indicated as "r1", and in FIGS. 4 and 5, the "circumferential direction" is indicated as "c1". In addition, a direction orthogonal to the rotation axes of the planetary gear and the crankshaft to be described later is referred to as a "second radial direction". In addition, in FIGS. 3 and 4 described later, the "second radial direction" is indicated as "r2".

In addition, hereinafter, in FIGS. 3 and 7 described later, the shape and positional relationship of each part will be described with the direction of the central axis of the speed reducer and the direction of the rotation axes of the planetary gear and the crankshaft as a left-right direction, the right side as "one axial side", and the left side as "other axial side". In addition, in FIGS. 3, 6, and 7 described later, "one axial side" is indicated as "a1", and "other axial side" is indicated as "a2". However, the definition of the left-right direction is not intended to limit the orientation at the time of manufacturing and use of the bearing, the speed reducer, and the robot according to the present disclosure. In addition, in the present disclosure, the "parallel direction" is not limited to a case of being geometrically strictly parallel. That is, the direction substantially parallel to a certain direction may be substantially parallel to the extent that the disclosed effect is exhibited. In addition, in the present disclosure, the "orthogonal direction" is not limited to a case where the directions are geometrically and strictly orthogonal. That is, it is sufficient that a direction substantially orthogonal to a certain direction is substantially orthogonal to the extent that the disclosed effect is exhibited.

Figure 2:
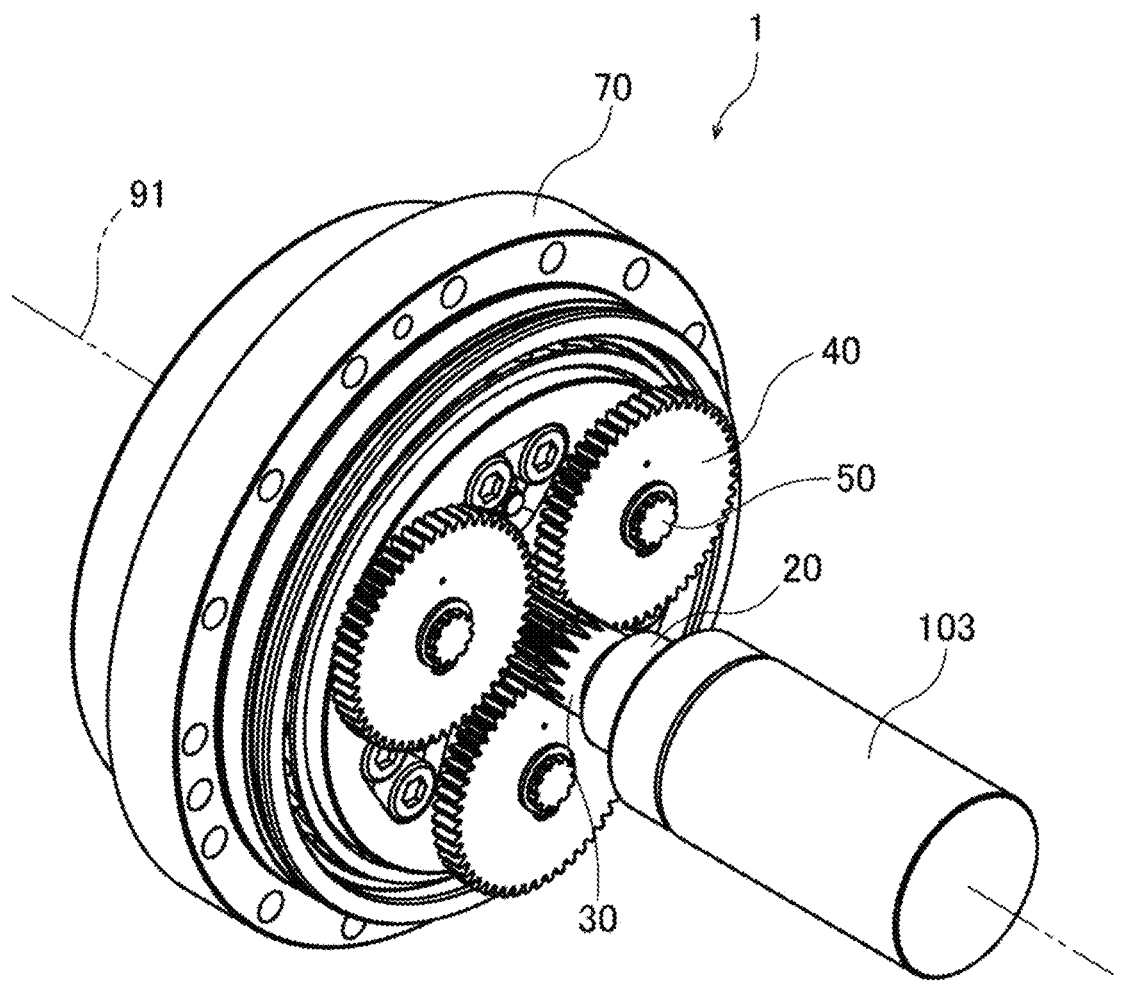
FIG. 2 is a perspective view of a speed reducer according to an example embodiment of the present disclosure.

FIG. 2 is a perspective view of the speed reducer 1. FIG. 3 is a longitudinal cross-sectional view of the speed reducer 1. In FIG. 3, an input shaft 20 to be described later and a sun gear 30 to be described later are partially simplified in order to avoid complication of the drawing. The motor 103 is disposed along a central axis (not illustrated) extending in the axial direction. The central axis of the motor 103 and a central axis 91 of the speed reducer 1 coincide with each other. The motor 103 includes a stationary part including a stator and a rotation part including a rotor. When the drive current is supplied to the stator, the rotation part including the rotor rotates about the central axis 91 at an input rotational speed N1 that is a rotational speed before deceleration.

The speed reducer 1 decelerates the rotational motion obtained from the motor 103 and transmits the decelerated rotational motion to the arm 102. In the present example embodiment, the speed reducer 1 is configured as an eccentric swing type speed reducer. More specifically, the speed reducer 1 is capable of decelerating rotation of the input shaft 20 to be described later, which is an input part, and rotating an output shaft 95 to be described later, which is an output part. That is, the speed reducer 1 can decelerate and output the rotation of the input shaft 20. However, the speed reducer 1 may be a speed reducer of a type different from the eccentric swing type speed reducer.

Figure 3:
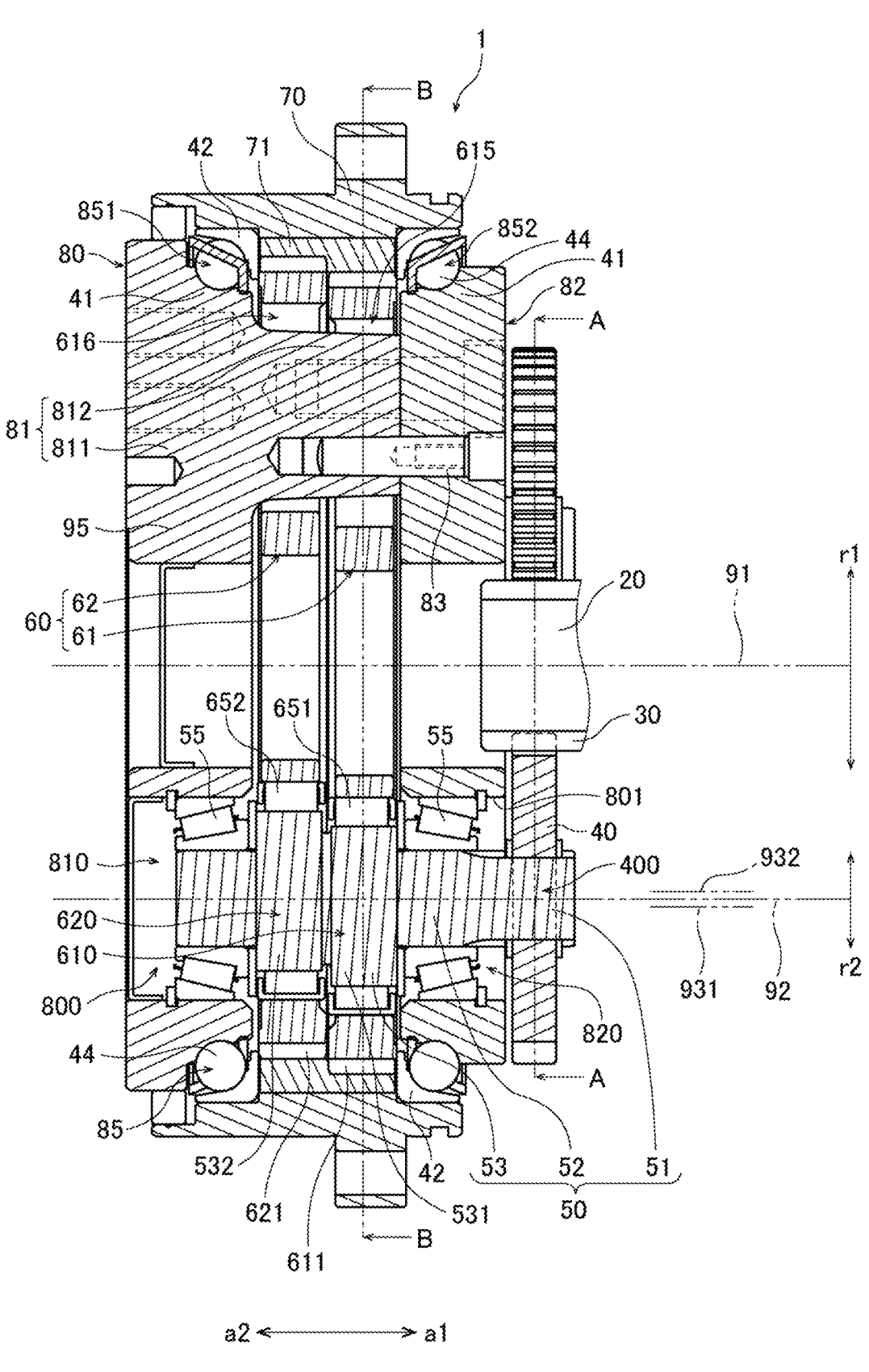
FIG. 3 is a longitudinal cross-sectional view of a speed reducer according to an example embodiment of the present disclosure.

As illustrated in FIGS. 2 and 3, the speed reducer 1 includes an input shaft 20, a sun gear 30, a plurality of planetary gears 40, a plurality of crankshafts 50, a plurality of bearings 55, a plurality of external gears 60, a plurality of bearings 651, a plurality of bearings 652, an internal gear 70, a carrier 80, and a plurality of bearings 85. In the present example embodiment, the speed reducer 1 includes an input shaft 20, a sun gear 30, three planetary gears 40, three crankshafts 50, six bearings 55, two external gears 60, three bearings 651, three bearings 652, an internal gear 70, a carrier 80, and two bearings 85.

The input shaft 20 is a member that extends in the axial direction about the central axis 91. The input shaft 20 is connected to a rotation part of the motor 103. The input shaft 20 is fixed to the rotation part of the motor 103 so as not to be relatively rotatable. As a result, the input shaft 20 can rotate at the input rotational speed N1 about the central axis 91 together with the rotation part of the motor 103.

The sun gear 30 is a gear disposed coaxially with the central axis 91. The sun gear 30 is fixed around the input shaft 20 so as not to be relatively rotatable. Thus, when the motor 103 is driven, the input shaft 20 and the sun gear 30 rotate at the input rotational speed N1 about the central axis 91. That is, the sun gear 30 is rotatable together with the input shaft 20 about the central axis 91 at the input rotational speed N1. However, the sun gear 30 and the input shaft 20 may be a single member.

Figure 4:
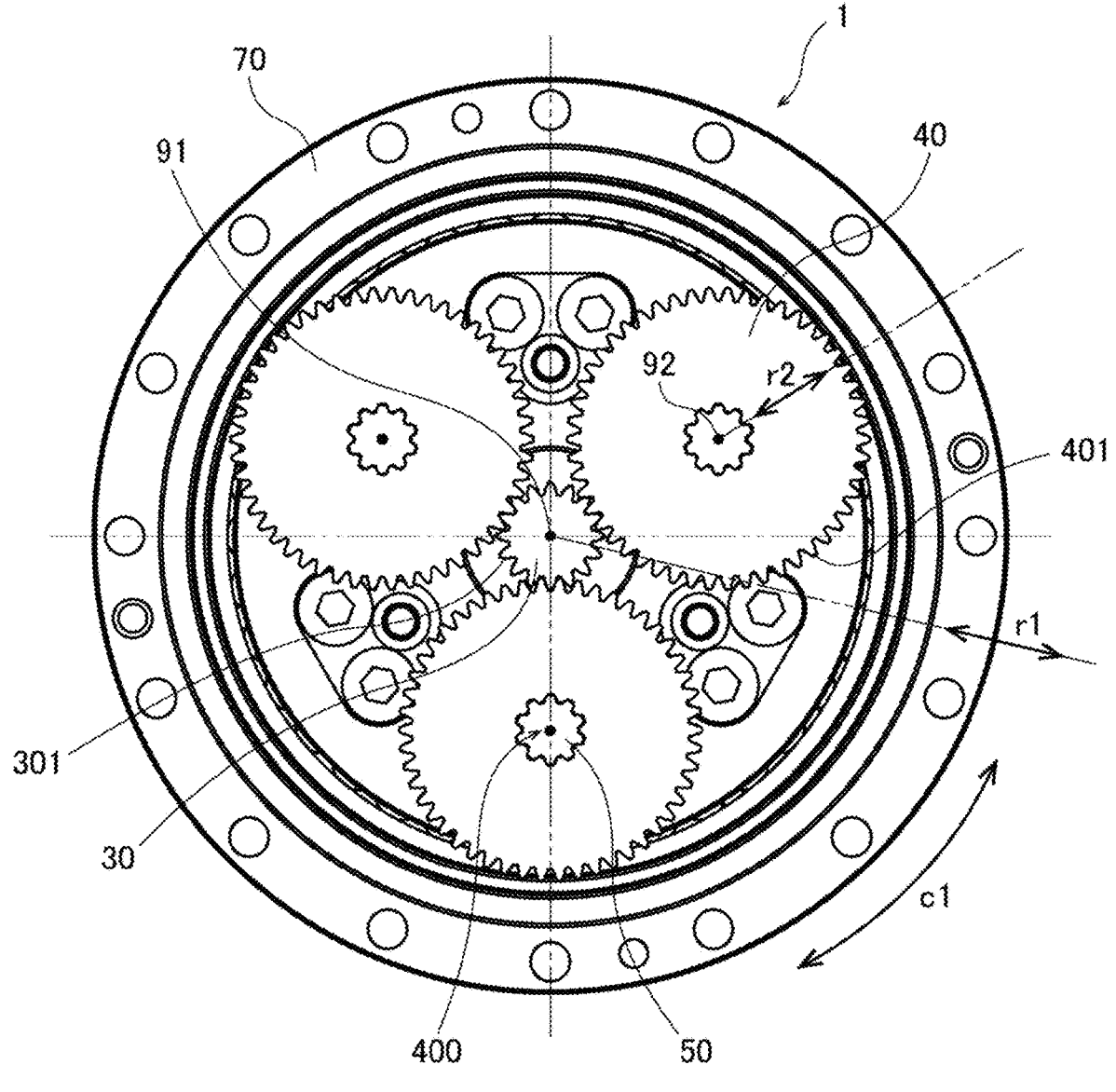
FIG. 4 is a transverse cross-sectional view of the speed reducer.

FIG. 4 is a transverse cross-sectional view of the speed reducer 1 viewed from A-A position in FIG. 3. To avoid complication of the drawings, hatching that indicates a cross section is not illustrated in FIG. 4. As illustrated in FIG. 4, a plurality of external teeth 301 are formed on the outer surface of the sun gear 30. Each of the plurality of external teeth 301 protrudes outward in the first radial direction r1. In addition, the plurality of external teeth 301 are arrayed at a constant pitch along a circumferential direction c1.

The planetary gears 40 are disposed around the sun gear 30. In addition, in the present example embodiment, as illustrated in FIG. 4, three planetary gears 40 are spaced uniformly around the sun gear 30. However, the number of the planetary gears 40 may be 2 or 4 or more. Each of the three planetary gears 40 is disposed along a rotation axis 92. The rotation axis 92 is substantially parallel to the central axis 91. In addition, the planetary gear 40 expands in a disk shape in the second radial direction r2 about the rotation axis 92. In addition, each of the planetary gears 40 has a plurality of external teeth 401 on its outer surface. Each of the plurality of external teeth 401 protrudes outward in the second radial direction r2.

The external teeth 401 mesh with the external teeth 301 from the outside in the first radial direction r1 about the central axis 91. That is, each of the plurality of planetary gears 40 meshes with the sun gear 30 from the outside in the first radial direction r1 about the central axis 91. As a result, when the sun gear 30 rotates about the central axis 91, each planetary gear 40 receives power from the sun gear 30 and rotates about the rotation axis 92 in a direction opposite to the rotation direction of the sun gear 30. That is, each of the plurality of planetary gears 40 can rotate with the rotation of the sun gear 30.

Here, in the present example embodiment, as illustrated in FIG. 4, the diameter of each planetary gear 40 is larger than the diameter of the sun gear 30. In addition, the number of the external teeth 401 of one planetary gear 40 is larger than the number of the external teeth 301 of the sun gear 30. Therefore, each of the planetary gears 40 meshes with the sun gear 30 to rotate about the rotation axis 92 at an intermediate rotational speed N2 after deceleration lower than the input rotational speed N1. However, when the speed reducer 1 does not rotate the output shaft 95 by decelerating the rotation of the input shaft 20 as in the present example embodiment, but rotates the output shaft 95 by accelerating the rotation of the input shaft 20, the diameter of each planetary gear 40 may be made smaller than the diameter of the sun gear 30. In addition, the number of external teeth 401 of one planetary gear 40 may be smaller than the number of external teeth 301 of the sun gear 30. Thus, each of the planetary gears 40 may be meshed with the sun gear 30 to rotate about the rotation axis 92 at the intermediate rotational speed N2 accelerated higher than the input rotational speed N1. Each of the three planetary gears 40 is provided with a through hole 400. Each through hole 400 penetrates the planetary gear 40 in the axial direction along the rotation axis 92.

The crankshaft 50 is a columnar member extending along the rotation axis 92. As illustrated in FIG. 4, in the present example embodiment, one crankshaft 50 is provided for each planetary gear 40. That is, the speed reducer 1 has a total of three crankshafts 50. Each of the plurality of crankshafts 50 includes a fixing portion 51, a shaft-like portion 52, and an eccentric portion 53.

The fixing portion 51 is a portion located on one axial side a1 of the crankshaft 50. The planetary gear 40 is inserted into the fixing portion 51 along the direction of the rotation axis 92 through the through hole 400. The planetary gear 40 is spline-connected to the fixing portion 51. As a result, each of the three crankshafts 50 can rotate at the intermediate rotational speed N2 about the rotation axis 92 together with the planetary gears 40 along with the rotation of the planetary gears 40. However, the planetary gears 40 may be fixed to the fixing portion 51 by press fitting, bonding, welding, or other methods.

The shaft-like portion 52 is a columnar portion extending along the rotation axis 92 on the other axial side a2 of the crankshaft 50 with respect to the fixing portion 51. That is, the shaft-like portion 52 extends in a columnar shape from the fixing portion 51 to the other axial side a2. The shaft-like portion 52 and the eccentric portion 53 are arranged in a cavity 800, described later, of the carrier 80.

As illustrated in FIG. 3, the bearing 55 is interposed between an inner wall 801 facing the cavity 800 described later inside the carrier 80 and an outer peripheral surface of the shaft-like portion 52 in the second radial direction r2. In the present example embodiment, two bearings 55 are provided at intervals in the axial direction with respect to one crankshaft 50. More specifically, the bearing 55 is provided between the outer peripheral surface and the inner wall 801 of the portion of the shaft-like portion 52 on the one axial side a1 and between the outer peripheral surface and the inner wall 801 of the portion of the shaft-like portion 52 on the other axial side a2. In addition, as the bearing 55, for example, a tapered roller bearing is used. However, other types of bearings may be used for the bearing 55. As a result, the crankshaft 50 is supported so as to be rotatable about the rotation axis 92 with respect to the carrier 80.

The eccentric portion 53 is a portion protruding outward in the second radial direction r2 from the shaft-like portion 52. That is, at least a part of the eccentric portion 53 is disposed outside the shaft-like portion 52 in the second radial direction r2 about the rotation axis 92. In the present example embodiment, two eccentric portions 53 are provided between two bearings 55 fixed to one crankshaft 50 in the axial direction. Hereinafter, of the two eccentric portions 53, a portion located on the one axial side a1 will be referred to as a "first eccentric portion 531", and a portion located on the other axial side a2 will be referred to as a "second eccentric portion 532". In one crankshaft 50, one first eccentric portion 531 and one second eccentric portion 532 are provided side by side in the axial direction. In addition, as described above, each of the first eccentric portion 531 and the second eccentric portion 532 is disposed in the cavity 800, which will be described later, of the carrier 80.

The first eccentric portion 531 is a portion that is parallel to the rotation axis 92 and extends in a columnar shape along a first eccentric axis 931 displaced from the rotation axis 92. The first eccentric portions 531 of the three crankshafts 50 provided in the speed reducer 1 are displaced in the same direction with respect to the rotation axis 92. The second eccentric portion 532 is a portion that is parallel to the rotation axis 92 and extends in a columnar shape along a second eccentric axis 932 displaced from the rotation axis 92. The second eccentric portions 532 of the three crankshafts 50 provided in the speed reducer 1 are displaced in the same direction with respect to the rotation axis 92. In addition, when viewed in the axial direction, the directions in which the first eccentric axis 931 and the second eccentric axis 932 are displaced are separated from each other by about 180 degrees about the rotation axis 92. That is, the first eccentric portion 531 and the second eccentric portion 532 are eccentric from the rotation axis 92 in directions different from each other by about 180 degrees with respect to the rotation axis 92.

Figure 5:
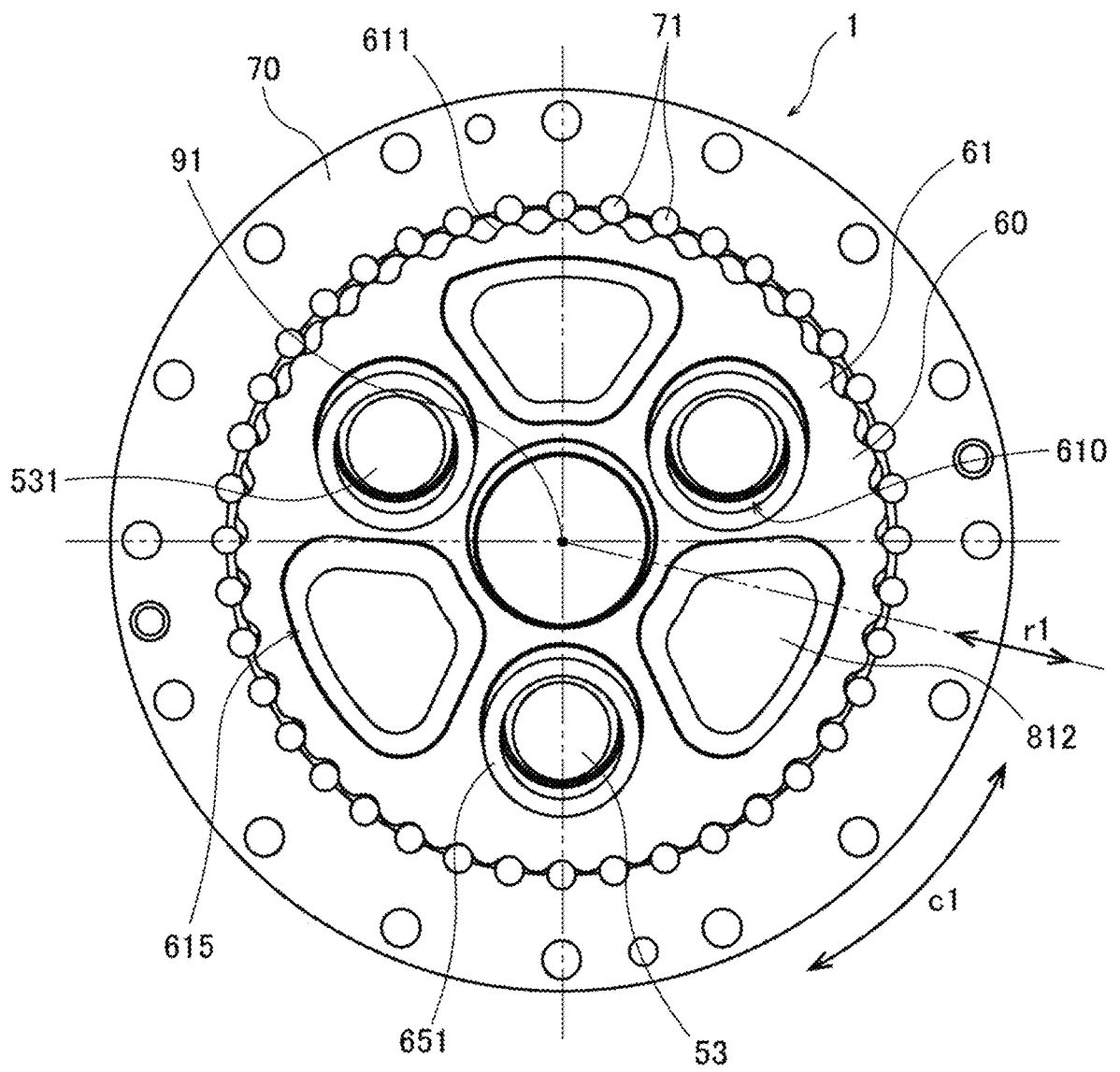
FIG. 5 is a transverse cross-sectional view of the speed reducer.

The external gear 60 is a member held between a carrier base 811, which will be described later, of the carrier 80 and a second carrier 82 in the axial direction. The external gear 60 of the present example embodiment includes a first gear portion 61 and a second gear portion 62. The first gear portion 61 is located on one axial side a1 with respect to the second gear portion 62. Each of the first gear portion 61 and the second gear portion 62 expands in a disk shape in the first radial direction r1 about the central axis 91. The first gear portion 61 and the second gear portion 62 have substantially the same shape and size. FIG. 5 is a transverse cross-sectional view (however, illustrated from a slightly oblique upper direction) of the speed reducer 1 as viewed from position B-B in FIG. 3. To avoid complication of the drawings, hatching that indicates a cross section is not illustrated in FIG. 5.

As illustrated in FIGS. 3 and 5, the first gear portion 61 has a plurality of external teeth 611 on the outer surface in the first radial direction r1. The second gear portion 62 has a plurality of external teeth 621 on the outer surface in the first radial direction r1. Each of the plurality of external teeth 611 and 621 protrudes outward in the first radial direction r1.

In addition, the first gear portion 61 has a plurality of insertion portions 610. In the present example embodiment, the first gear portion 61 has three insertion portions 610. Each of the three insertion portions 610 penetrates the first gear portion 61 in the axial direction. In addition, the first eccentric portion 531 of the crankshaft 50 is inserted into each of the three insertion portions 610. The second gear portion 62 has a plurality of insertion portions 620. In the present example embodiment, the second gear portion 62 has three insertion portions 620. Each of the three insertion portions 620 penetrates the second gear portion 62 in the axial direction at a position of the insertion portion 610 on the other axial side a2. In addition, the second eccentric portion 532 of the crankshaft 50 is inserted into each of the three insertion portions 620.

Here, the bearing 651 is inserted between the outer peripheral surface of the first eccentric portion 531 and the inner wall of the first gear portion 61 facing the insertion portion 610. The bearings 651 are, for example, needle bearings. As a result, the first eccentric portion 531 is rotatably supported about the rotation axis 92 with respect to the first gear portion 61 in accordance with the rotation of the crankshaft 50. In addition, the bearing 652 is inserted between the outer peripheral surface of the second eccentric portion 532 and the inner wall of the second gear portion 62 facing the insertion portion 620. The bearings 652 are, for example, needle bearings. As a result, the second eccentric portion 532 is rotatably supported about the rotation axis 92 with respect to the second gear portion 62 in accordance with the rotation of the crankshaft 50.

As described above, the first eccentric portion 531 of each of the three crankshafts 50 extends in a columnar shape along the first eccentric axis 931 displaced from the rotation axis 92. In addition, the first eccentric portions 531 of the three crankshafts 50 are displaced in the same direction with respect to the rotation axis 92. Therefore, when each of the three crankshafts 50 rotates about the rotation axis 92, each of the three first eccentric portions 531 eccentrically rotates about the rotation axis 92. As a result, the first gear portion 61 swings in the first radial direction r1 in a circular space defined by internal teeth 71 to be described later of the internal gear 70. In addition, the second eccentric portions 532 of the three crankshafts 50 extend in a columnar shape along the second eccentric axis 932 displaced from the rotation axis 92. In addition, the second eccentric portions 532 of the three crankshafts 50 are displaced in the same direction with respect to the rotation axis 92. Therefore, when each of the three crankshafts 50 rotates about the rotation axis 92, each of the three second eccentric portions 532 eccentrically rotates about the rotation axis 92. As a result, the second gear portion 62 swings in the first radial direction r1 in a circular space defined by the internal teeth 71 to be described later of the internal gear 70.

As illustrated in FIGS. 3 and 5, the first gear portion 61 has a plurality of passing holes 615. In the present example embodiment, the first gear portion 61 has three passing holes 615. Each of the three passing holes 615 penetrates the first gear portion 61 in the axial direction. In addition, the passing hole 615 is provided between the insertion portions 610 adjacent to each other in the circumferential direction c1 as viewed in the axial direction. A carrier pillar portion 812 to be described later of the carrier 80 is inserted into each of the passing holes 615 in the axial direction. The second gear portion 62 has a plurality of passing holes 616. In the present example embodiment, the second gear portion 62 has three passing holes 616. Each of the three passing holes 616 penetrates the second gear portion 62 in the axial direction at a position of the passing hole 615 on the other axial side a2. In addition, the passing hole 616 is provided between the insertion portions 620 adjacent to each other in the circumferential direction c1 as viewed in the axial direction. The carrier pillar portion 812 to be described later is inserted into each of the passing holes 616 in the axial direction. As a result, each of the first gear portion 61 and the second gear portion 62 is rotatable about the central axis 91.

The internal gear 70 is disposed to be substantially coaxial with the central axis 91. The internal gear 70 expands in an annular shape with the central axis 91 as the center. The internal gear 70 of the present example embodiment is fixed to the base frame 101 in a non-movable and non-rotatable manner. As a result, the movement of the internal gear 70 in the circumferential direction c1, the first radial direction r1, and the axial direction is restricted.

In addition, as illustrated in FIG. 5, a plurality of internal teeth 71 are formed on the inner surface of the internal gear 70 in the circumferential direction c1. In the present example embodiment, a plurality of internal teeth pins are arranged on the inner surface of the internal gear 70 at a constant pitch in the circumferential direction c1, so that the plurality of internal teeth 71 are formed at a constant pitch in the circumferential direction c1. However, the method of forming the plurality of internal teeth 71 is not limited thereto. In addition, each of the plurality of internal teeth 71 protrudes inward in the first radial direction r1.

As described above, when the first gear portion 61 swings in the first radial direction r1, the external teeth 611 of the first gear portion 61 located in the direction swinging from the central axis 91 mesh with the internal teeth 71 of the internal gear 70. Similarly, when the second gear portion 62 swings in the first radial direction r1, the external teeth 621 of the second gear portion 62 located in the direction swinging from the central axis 91 mesh with the internal teeth 71 of the internal gear 70 on the other axial side a2 of the first gear portion 61. That is, the internal gear 70 meshes with the external teeth 611 and 621 from the outside in the first radial direction r1. That is, the external teeth 611 and 621 mesh with the internal gear 70 while swinging about the central axis 91.

The carrier 80 is a substantially cylindrical member disposed coaxially with the central axis 91. The carrier 80 includes a first carrier 81, a second carrier 82, and a fixing bolt 83. The first carrier 81 is a member located on the other axial side a2 of the carrier 80. The second carrier 82 is a member located on one axial side a1 of the carrier 80.

In addition, the first carrier 81 includes a carrier base 811 and a plurality of carrier pillar portions 812. In the present example embodiment, the first carrier 81 includes a carrier base 811 and three carrier pillar portions 812. The carrier base 811 is a portion extending coaxially with the central axis 91 and in a substantially cylindrical shape at a position on the other axial side a2 of the first carrier 81. Each of the three carrier pillar portions 812 extends in parallel with the central axis 91 and in a columnar shape from the surface of the carrier base 811 on the one axial side a1 to the one axial side a1. As described above, each of the three carrier pillar portions 812 penetrates the passing hole 615 of the first gear portion 61 and the passing hole 616 of the second gear portion 62.

In addition, the carrier base 811 has a plurality of through holes 810 on the outer side in the first radial direction r1 with respect to the central axis 91. In the present example embodiment, the carrier base 811 has three through holes 810. Each of the three through holes 810 penetrates the carrier base 811 in the axial direction. In addition, each of the three through holes 810 overlaps the insertion portion 610 of the first gear portion 61 and the insertion portion 620 of the second gear portion 62 in the axial direction.

In addition, the second carrier 82 has an annular plate shape about the central axis 91. The second carrier 82 is fixed to the first carrier 81 by bolting using the fixing bolt 83. In addition, the second carrier 82 has a plurality of through holes 820 on the outer side in the first radial direction r1 with respect to the central axis 91. In the present example embodiment, the second carrier 82 has three through holes 820. Each of the three through holes 820 penetrates the second carrier 82 in the axial direction. In addition, each of the three through holes 820 overlaps the insertion portion 610 of the first gear portion 61 and the insertion portion 620 of the second gear portion 62 in the axial direction.

By the through hole 810, the insertion portion 620 of the second gear portion 62, the insertion portion 610 of the first gear portion 61, and the through hole 820, three cavities 800 are formed at equal intervals in the circumferential direction c1 about the central axis 91 inside the carrier 80. Each of the three planetary gears 40 is fixed to the crankshaft 50, and the crankshaft 50 is inserted into the cavity 800 and rotatably supported with respect to the carrier 80 via two bearings 55. That is, the carrier 80 rotatably supports each of the plurality of crankshafts 50.

In addition, a bearing 851 is inserted between the outer peripheral surface of the carrier base 811 and the inner peripheral surface of the internal gear 70. In the present example embodiment, an inner ring 41 of the bearing 851 is formed as a single member with the carrier base 811 on the outer peripheral portion of the carrier base 811. That is, as illustrated in FIG. 7 described later, the inner ring 41 of the bearing 851 is the carrier 80. An outer ring 42 of the bearing 851 is fixed to the inner peripheral surface of the internal gear 70. In addition, a bearing 852 is inserted between the outer peripheral surface of the second carrier 82 and the inner peripheral surface of the internal gear 70. In the present example embodiment, the inner ring 41 of the bearing 852 is formed as a single member with the second carrier 82 on the outer peripheral portion of the second carrier 82. That is, the inner ring 41 of the bearing 852 is the carrier 80. The outer ring 42 of the bearing 852 is fixed to the inner peripheral surface of the internal gear 70. The bearing 851 and the bearing 852 are each disposed coaxially with the central axis 91.

Thus, the carrier 80 is rotatably supported about the central axis 91 with respect to the internal gear 70 via the bearing 851 and the bearing 852. In addition, the three crankshafts 50 supported by the carrier 80 via the bearings 55 and the three planetary gears 40 fixed to the three crankshafts 50 are supported so as to be revolvable about the central axis 91.

In addition, an angular ball bearing is used for each of the bearing 851 and the bearing 852 of the present example embodiment. In addition, the bearing 851 and the bearing 852 have structures equivalent to each other. In addition, the bearing 851 and the bearing 852 are disposed so as to be symmetrical to each other with respect to a reference plane (not illustrated) which is located between the bearing 851 and the bearing 852 and is orthogonal to the central axis 91. Hereinafter, the bearing 851 and the bearing 852 will be referred to as "bearing 85", respectively. The bearing 85 is an example of a "bearing" of the present disclosure. That is, the speed reducer 1 includes a "bearing" which is the bearing 85. As a result, it is possible to provide the speed reducer 1 including the bearing 85 capable of securing the thickness of the column portion 431 of the retainer 43 even when the gap between the adjacent rollers 44 is narrowed when the number of the rollers 44 is increased while the diameters of the rollers 44 are reduced by the mechanism described later. However, another type of bearing such as a roller bearing may be used for the bearing 85. Detailed structure of the bearing 85 will be described later.

As described above, when the first gear portion 61 into which each of the first eccentric portions 531 of the three crankshafts 50 is inserted swings in the first radial direction r1, the external teeth 611 of the first gear portion 61 located in the direction swinging from the central axis 91 mesh with the internal teeth 71 of the internal gear 70. In addition, when the second gear portion 62 into which each of the second eccentric portions 532 of the three crankshafts 50 is inserted swings in the first radial direction r1, the external teeth 621 of the second gear portion 62 located in the direction swinging from the central axis 91 mesh with the internal teeth 71 of the internal gear 70. In addition, the first eccentric portion 531 and the second eccentric portion 532 are eccentric from the rotation axis 92 in directions different from each other by about 180 degrees with respect to the rotation axis 92. Therefore, the external teeth 611 of the first gear portion 61 and the external teeth 621 of the second gear portion 62 mesh with the internal teeth 71 of the internal gear 70 at positions separated from each other by about 180 degrees about the central axis 91.

When each of the three crankshafts 50 rotates about the rotation axis 92 at the intermediate rotational speed N2, the swing direction of the first gear portion 61 and the swing direction of the second gear portion 62 also change. Therefore, the meshing position between the external teeth 611 of the first gear portion 61 and the internal teeth 71 of the internal gear 70 and the meshing position between the external teeth 621 of the second gear portion 62 and the internal teeth 71 of the internal gear 70 also change. Here, the internal gear 70 is fixed to the base frame 101 of the robot 100 and does not rotate. As a result, the carrier 80 rotates about the central axis 91 with respect to the internal gear 70 and the base frame 101 at an output rotational speed N3 after deceleration lower than the intermediate rotational speed N2. That is, the carrier 80 is rotatable at the output rotational speed N3 about the central axis 91 by swinging of the external gear 60 with respect to the internal gear 70. That is, in the present example embodiment, the output shaft 95 is the carrier 80. As another example embodiment, the carrier 80 may be fixed to the base frame 101, and the internal gear 70 may be rotatable about the central axis 91 at the output rotational speed N3. In this case, the output shaft 95 in the other example embodiment is the internal gear 70.

Figure 6:
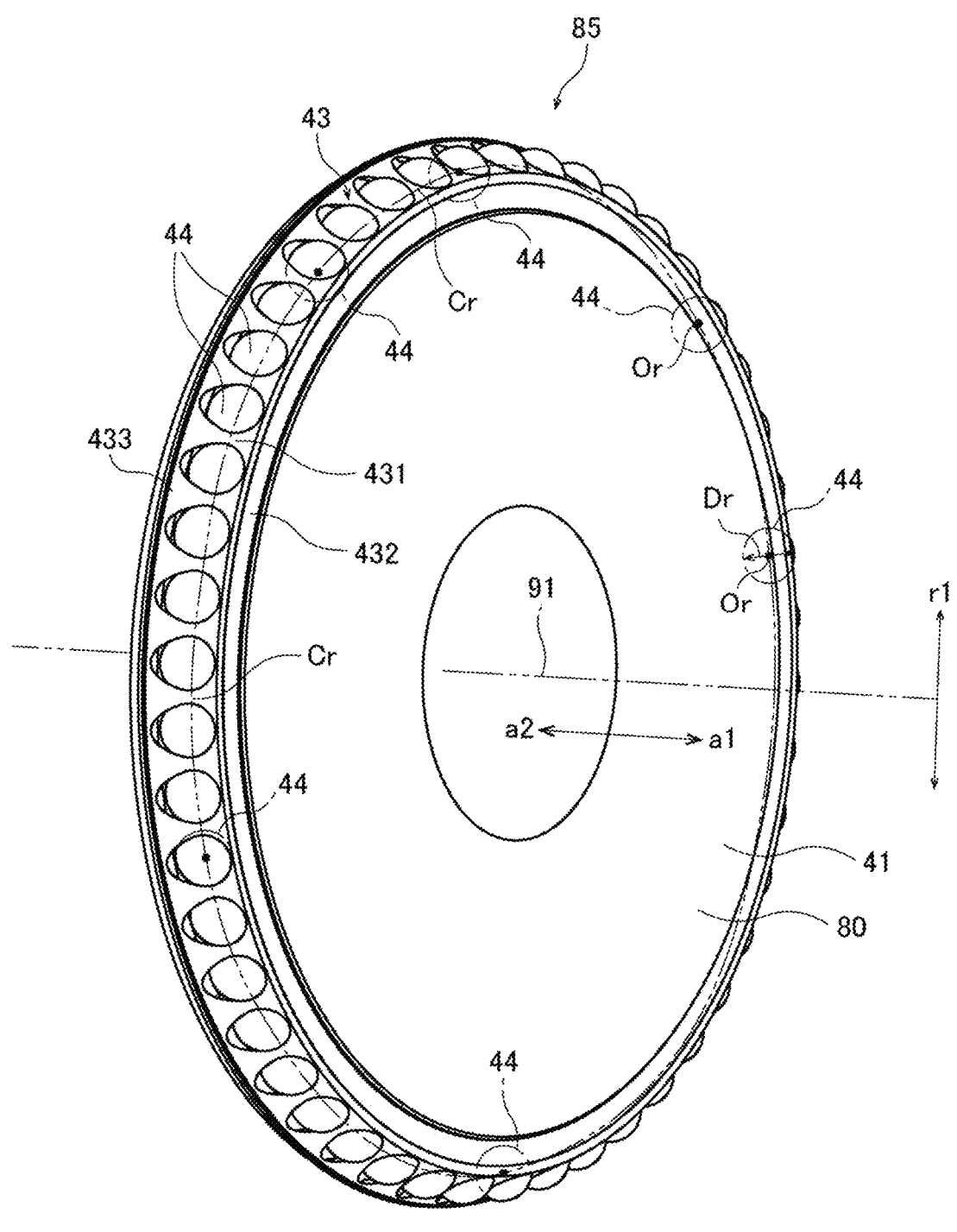
FIG. 6 is a perspective view of a bearing according to an example embodiment of the present disclosure.

Next, the detailed structure of the bearing 85 will be described. More specifically, the detailed structure of the bearing 851 will be described. The structure of the bearing 852 is obtained by inverting the structure of the bearing 851 in the axial direction. Therefore, the structure of the bearing 852 may be understood by replacing the one axial side a1 and the other axial side a2 in the structure of the bearing 851 with each other. FIG. 6 is a perspective view of the bearing 85. However, in FIG. 6, the inner ring 41 is simply illustrated, and the outer ring 42 is not illustrated. In addition, in FIG. 6, for ease of explanation, a part of a plurality of rollers 44 described later is indicated by a two-dot chain line. FIG. 7 is a partial longitudinal cross-sectional view of the vicinity of the bearing 851 of the speed reducer 1. That is, FIG. 7 is a partial longitudinal cross-sectional view of the vicinity of the bearing 85 of the speed reducer 1. To avoid complication of the drawings, hatching that indicates a cross section is not illustrated in FIG. 7. As illustrated in FIGS. 6 and 7, the bearing 85 includes an inner ring 41, an outer ring 42, a retainer 43, and a plurality of rollers 44.

The inner ring 41 is disposed radially outside the central axis 91. The radially outside surface of the inner ring 41 is formed in an annular shape about the central axis 91. In addition, as illustrated in FIG. 7, a recessed housing bottom portion 501 is formed on the radially outside surface of the inner ring 41. The housing bottom portion 501 is recessed radially inside over the entire circumference in the circumferential direction c1 on the radially outside surface of the inner ring 41. In addition, a groove 410 is further formed on one axial side a1 of the housing bottom portion 501 on the radially outside surface of the inner ring 41. The groove 410 is recessed radially inside over the entire circumference in the circumferential direction c1 on the radially outside surface of the inner ring 41. That is, the inner ring 41 has the groove 410 that is recessed radially inside from the radially outside surface and extends in the circumferential direction c1. However, for example, in an example embodiment in which the roller rotates at a specific position in the circumferential direction c1 with respect to the housing bottom portion and the retainer is stationary, each of the housing bottom portion and the groove may be formed only in a part in the circumferential direction c1.

The outer ring 42 is an annular member about the central axis 91. The outer ring 42 is disposed radially outside the inner ring 41. That is, the outer ring 42 is larger in diameter than the inner ring 41. In addition, as illustrated in FIG. 7, a recessed housing lid portion 502 is formed on a radially inner surface of the outer ring 42. The housing lid portion 502 is recessed radially outside over the entire circumference in the circumferential direction c1 on the radially inner surface of the outer ring 42. However, for example, in an example embodiment in which the roller rotates at a specific position in the circumferential direction c1 with respect to the housing lid portion, the housing lid portion may be formed only in a part in the circumferential direction c1.

The plurality of rollers 44 are located between the inner ring 41 and the outer ring 42. The rollers 44 of the present example embodiment are balls. The plurality of rollers 44 are located between the housing bottom portion 501 of the inner ring 41 and the housing lid portion 502 of the outer ring 42, and are rollable in the circumferential direction c1 along the housing bottom portion 501 and the housing lid portion 502. The inner ring 41, the outer ring 42, and the plurality of rollers 44 are formed of a metal such as a so-called bearing steel.

The retainer 43 is disposed between the inner ring 41 and the outer ring 42. The retainer 43 is a member for holding the plurality of rollers 44 in a state of being spaced apart in the circumferential direction c1 between the inner ring 41 and the outer ring 42. That is, the plurality of rollers 44 are arranged at intervals in the circumferential direction c1 by the retainer 43 between the inner ring 41 and the outer ring 42. The retainer 43 is formed of, for example, resin. In addition, in the present example embodiment, the retainer 43 is formed in an annular shape about the central axis 91. However, in another example embodiment, the retainer 43 may be formed in an arc shape about the central axis 91. The retainer 43 includes a plurality of column portions 431, a flange portion 432, and a connecting portion 433. That is, the retainer 43 includes the plurality of column portions 431 and the flange portion 432.

The column portions 431 are provided in the same number as the rollers 44. The column portions 431 are arranged one by one at intervals in the circumferential direction c1 of the rollers 44 arranged adjacent to each other at intervals in the circumferential direction c1. That is, the plurality of column portions 431 are disposed between the adjacent rollers 44.

Here, in the bearing 85 of the present disclosure, more rollers 44 are arranged in the circumferential direction c1 by reducing the diameters of the rollers 44. As a result, as illustrated in FIG. 6, the bearing 85 of the present example embodiment satisfies the relationship of "φ×N/L>0.92", where φ is a diameter Dr of the ball which is the roller 44, N is the number of balls, and L is the length of the circumference of the circle Cr connecting the centers of the balls. As described above, by increasing the number of balls, the rigidity of the bearing 85 can be improved.

However, in this case, since the interval in the circumferential direction c1 between the adjacent rollers 44 becomes small, the thick column portions cannot be arranged as they are at the interval in the circumferential direction c1. Therefore, in the present example embodiment, the plurality of column portions 431 are arranged on the outer side in the first radial direction r1. Specifically, as illustrated in FIG. 7, in a transverse plane Sc passing through a radial center Or of the roller 44 and orthogonal to the central axis 91, a radial center Op of the column portion 431 is disposed radially outside the radial center Or of the roller 44. In this manner, while the diameter of the rollers 44 is reduced to increase the number of the rollers 44, the space for providing the column portions 431 can be secured by arranging the column portions 431 on the outer side in the first radial direction r1. As a result, even when the number of the rollers 44 is increased and the gap in the circumferential direction c1 between the adjacent rollers 44 is narrowed, the column portions 431 can be disposed radially outside and the thickness of the column portions 431 can be secured, whereby the strength of the entire retainer 43 including the column portions 431 can be enhanced. In the present example embodiment, the column portion 431 has a columnar shape extending in the axial direction. The radial center Op of the column portion 431 is a radial midpoint between a radially inner end Ip and a radially outer end Ep of the column portion 431. Here, for example, when there are a plurality of radially inner ends or radially outer ends of the column portions, the radial positions of the radially inner ends and the radially outer ends may be defined as a representative of any of them.

In particular, in the present example embodiment, in the transverse plane Sc, the radially inner end Ip of the column portion 431 is disposed radially outside the radial center Or of the roller 44. In this manner, while the diameter of the rollers 44 is reduced to increase the number of the rollers 44, the space for providing the column portions 431 can be further secured by arranging the column portions 431 on the outer side in the first radial direction r1. As a result, since the thickness of the column portion 431 can be further secured, the strength of the entire retainer 43 including the column portion 431 can be further enhanced.

In addition, in the present example embodiment, in the transverse plane Sc, the radially outer end Ep of the column portion 431 is disposed radially outside a radial midpoint Mrr between the radial center Or of the roller 44 and the radially outer end Er of the roller 44. In this manner, while the diameter of the rollers 44 is reduced to increase the number of the rollers 44, the space for providing the column portions 431 can be further secured by arranging the column portions 431 on the outer side in the first radial direction r1. As a result, since the thickness of the column portion 431 can be further secured, the strength of the entire retainer 43 including the column portion 431 can be further enhanced.

Figure 7:
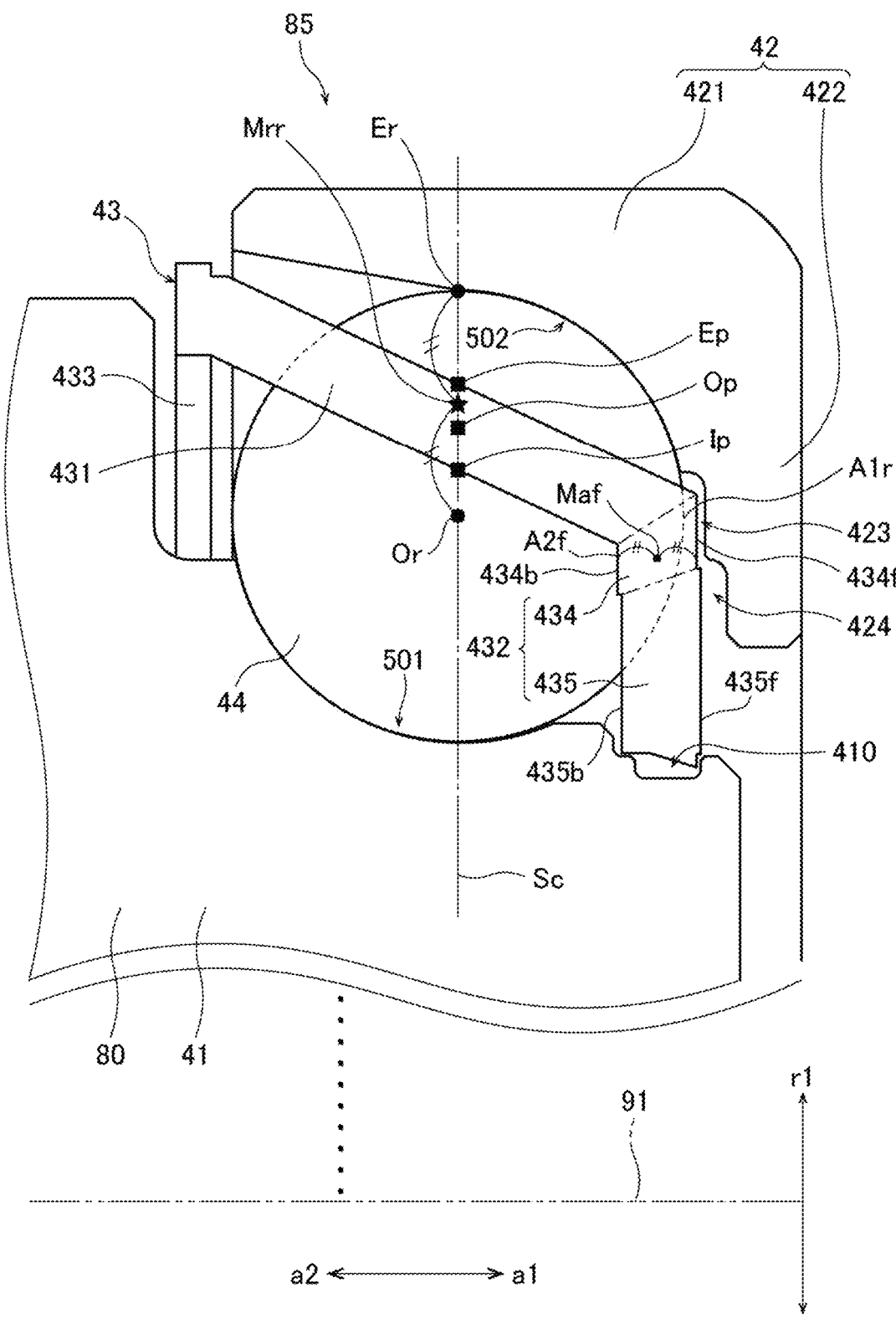
FIG. 7 is a partial longitudinal cross-sectional view of the speed reducer.

In addition, as illustrated in FIG. 7, each of the column portions 431 is inclined with respect to the axial direction, and the end portion of the column portion 431 on one axial side a1 is disposed radially inside the end portion of the column portion 431 on the other axial side a2. As a result, in the bearing 85 which is an angular ball bearing, the column portion 431 can be disposed at an angle corresponding to the contact position between the rollers 44 and the outer ring 42. As a result, it is possible to hold the rollers 44 and suppress the rollers 44 from falling off while avoiding the column portions 431 from coming into contact with the outer ring 42.

As illustrated in FIG. 6, the flange portion 432 is a portion of an annular shape about the central axis 91. The flange portion 432 extends radially inside from the end portion of the column portion 431 on the one axial side a1. The flange portion 432 connects the end portions of the plurality of column portions 431 on the one axial side a1 in the circumferential direction c1. Each of the plurality of rollers 44 is disposed on the housing bottom portion 501 of the inner ring 41 and held between the inner ring 41, the plurality of column portions 431 of the retainer 43, and the flange portion 432 of the retainer 43. This prevents the plurality of rollers 44 disposed on the housing bottom portion 501 of the inner ring 41 from falling off.

In addition, in the present example embodiment, in a state where the rollers 44 are disposed on the recessed housing bottom portion 501 on the radially outside surface of the inner ring 41, the radially inner end portion of the flange portion 432 is fitted into the groove 410 of the inner ring 41 from the radially outside to the radially inside. That is, the radially inner end portion of the flange portion 432 is accommodated in the groove 410. As a result, it is possible to suppress the flange portion 432 from being deviated from the inner ring 41 in the axial direction. That is, the retainer 43 can be prevented from coming off from the inner ring 41 in the axial direction.

In the present example embodiment, the flange portion 432 is formed on the other axial side a2 so as to further press the plurality of rollers 44 disposed on the housing bottom portion 501 of the inner ring 41 toward the inside of the housing bottom portion 501. Specifically, the other axial end A2f of the flange portion 432 is disposed on the other axial side a2 with respect to one axial end A1r of the roller 44. As a result, the plurality of rollers 44 can be held using not only the plurality of column portions 431 of the retainer 43 but also the flange portion 432. This further prevents the plurality of rollers 44 disposed on the housing bottom portion 501 of the inner ring 41 from falling off during the subsequent manufacturing process and use of the bearing 85.

In particular, in the present example embodiment, an axial center Maf of the flange portion 432 is disposed on the other axial side a2 with respect to the one axial end A1r of the roller 44. The axial center Maf of the flange portion 432 indicates the axial center of a portion of the flange portion 432 that overlaps the rollers 44 in the axial direction radially outside a stepped portion described later. This makes it possible to more stably hold the rollers 44 by the flange portions 432. In addition, by forming the flange portion 432 further on the other axial side a2, the bearing 85 can be downsized in the axial direction while securing the axial width of the flange portion 432.

As described above, the retainer 43 further includes the connecting portion 433. The connecting portion 433 connects the end portions of the plurality of column portions 431 on the other axial side a2 in the circumferential direction c1. By providing the connecting portion 433, the strength of the retainer 43 can be further enhanced.

In addition, the outer ring 42 includes a wall portion 421 and an annular portion 422. The wall portion 421 is disposed radially outside the roller 44 and extends in an axial direction. The annular portion 422 is disposed on one axial side a1 of the roller 44 and extends in the radial direction. Furthermore, the annular portion 422 has an annular first recess 423 and an annular second recess 424.

The first recess 423 is a portion recessed toward the one axial side a1 over the entire circumference in the circumferential direction c1 from the surface of the annular portion 422 on the other axial side a2. That is, the annular portion 422 has the annular first recess 423 recessed from the surface on the other axial side a2 toward the one axial side a1. In addition, a part of the flange portion 432 of the retainer 43 is located in the first recess 423. That is, a part of the flange portion 432 is accommodated in the first recess 423. With such a structure of the annular portion 422 of the outer ring 42 and the flange portion 432 of the retainer 43, the axial width of the flange portion 432 can be further increased. As a result, the strength of the entire retainer 43 including the flange portion 432 can be further enhanced. However, the first recess 423 may be formed only in a part in the circumferential direction c1.

The second recess 424 is a portion recessed from the surface of the annular portion 422 on the other axial side a2 toward the one axial side a1 with respect to the first recess 423 over the entire circumference in the circumferential direction c1 radially inside the first recess 423. That is, the annular portion 422 includes the annular second recess 424 that is disposed radially inside the first recess 423 and is recessed toward the one axial side a1 with respect to the first recess 423. A grease reservoir can be provided in the second recess 424. That is, it is possible to suppress the grease from leaking to the outside by the second recess 424. As a result, as the inner ring 41 rotates about the central axis 91, the grease reaches the entire contact portion between the outer ring 42 and the rollers 44 by centrifugal force. As a result, it is possible to further reduce the load applied to these members when the outer ring 42 and the rollers 44 come into contact with each other. However, the second recess 424 may be formed only in a part in the circumferential direction c1.

In addition, the flange portion 432 of the retainer 43 has a stepped shape in which a radially inside portion slightly protrudes to the one axial side a1. Accordingly, the flange portion 432 can be defined separately as an outer flange portion 434 and an inner flange portion 435. The outer flange portion 434 is a portion extending radially inside from the end portion of the column portion 431 on the one axial side a1. The outer flange portion 434 faces the first recess 423 of the outer ring 42 in the axial direction. The inner flange portion 435 is a portion that protrudes toward the one axial side a1 with respect to the outer flange portion 434 and further extends radially inside from the radially inner end portion of the outer flange portion 434. The inner flange portion 435 faces the second recess 424 of the outer ring 42 in the axial direction.

That is, the flange portion 432 includes the outer flange portion 434 axially facing the first recess 423 and the inner flange portion 435 axially facing the second recess 424. In addition, a surface 435f of the inner flange portion 435 on the one axial side a1 is disposed on the one axial side a1 with respect to a surface 434f of the outer flange portion 434 on the one axial side a1. A surface 435b of the inner flange portion 435 on the other axial side a2 is disposed on the one axial side a1 with respect to a surface 434b of the outer flange portion 434 on the other axial side a2. In the present example embodiment, by changing the axial positions of the outer flange portion 434 and the inner flange portion 435 as described above, the degree of freedom in designing the retainer 43 and the inner ring 41 can be improved. That is, by adjusting the axial position of the inner flange portion 435 in accordance with the axial position of the groove 410, the degree of freedom of the axial position where the groove 410 is formed can be improved.

While an example embodiment of the present disclosure has been described above, the present disclosure is not limited to the above example embodiment.

In the speed reducer 1 described above, the carrier 80 is fixed to the output shaft 95 and the arm 102 of the robot 100, and the internal gear 70 is fixed to the base frame 101 of the robot 100 in a non-movable and non-rotatable manner. However, the carrier 80 may be fixed to the base frame 101 of the robot 100 in a non-movable and non-rotatable manner, and the internal gear 70 may be fixed to the output shaft 95 and the arm 102 of the robot 100. Then, the internal gear 70 may be rotated about the central axis 91 by swinging of the external gear 60 held by the carrier 80. That is, at least one of the internal gear 70 and the carrier 80 only needs to be rotatable at the output rotational speed N3 about the central axis 91 by swinging of the external gear 60 with respect to the internal gear 70.

In addition, shapes of details of the bearing, the speed reducer, and the robot may be different from the shapes illustrated in the drawings of the above example embodiment.

The technologies according to example embodiments of the present disclosure can have the following configurations.

(1) A bearing including an inner ring located radially outside a central axis, an outer ring located radially outside the inner ring, a retainer with an annular shape located between the inner ring and the outer ring, and rollers positioned at intervals in a circumferential direction by the retainer between the inner ring and the outer ring, wherein the retainer includes column portions located between adjacent pairs of the rollers, and a flange portion connecting end portions on one axial side of the column portions in a circumferential direction, the flange portion extends radially inside from an end portion on one axial side of the column portions, a radial center of the column portions is located radially outside a radial center of the rollers in a transverse plane passing through the radial center of the rollers and orthogonal to the central axis, and another axial end of the flange portion is located on another axial side with respect to one axial end of the rollers.

(2) The bearing according to (1), in which in the transverse plane, a radially inner end of the column portions is located radially outside a radial center of the rollers.

(3) The bearing according to (1) or (2), in which, in the transverse plane, a radially outer end of the column portions is located radially outside a radial midpoint between a radial center of the rollers and a radially outer end of the rollers.

(4) The bearing according to any one of (1) to (3), in which, in the transverse plane, a radially outer end of the column portions is located radially outside a radial midpoint between a radial center of the rollers and a radially outer end of the rollers.

(5) The bearing according to any one of (1) to (4), in which the inner ring includes a groove that is recessed radially inside from a radially outside surface and extends in a circumferential direction, and a radially inner end portion of the flange portion is accommodated in the groove.

(6) The bearing according to any one of (1) to (5), in which the outer ring includes a wall portion located radially outside the rollers and extending in an axial direction, and an annular portion located on one axial side of the rollers and extending in a radial direction, the annular portion includes an annular first recess recessed toward one axial side from a surface on another axial side, and a portion of the flange portion is accommodated in the first recess.

(7) The bearing according to (6), in which the annular portion includes an annular second recess located radially inside the first recess and recessed toward one axial side from the first recess.

(8) The bearing according to (7), in which the flange portion includes an outer flange portion axially opposing the first recess, and an inner flange portion axially opposing the second recess, a surface on one axial side of the inner flange portion is located on one axial side with respect to a surface on one axial side of the outer flange portion, and a surface on another axial side of the inner flange portion is located on one axial side with respect to a surface on another axial side of the outer flange portion.

(9) The bearing according to any one of (1) to (8), in which the rollers are balls, and assuming that a diameter of the balls is $\varphi$, a number of the balls is N, and a length of a circumference connecting centers of the balls is L, a relationship of $\varphi \times N/L > 0.92$ is satisfied.

(10) The bearing according to any one of (1) to (9), in which the retainer further includes a connecting portion connecting end portions of the column portions on another axial side in a circumferential direction.

(11) The bearing according to any one of (1) to (10), in which the column portions are inclined with respect to an axial direction, and an end portion on one axial side of the column portions is located radially inside an end portion on another axial side of the column portions.

(12) A speed reducer including a bearing of any one of (1) to (11).

(13) A robot including a speed reducer according to (12).

Example embodiments of the present disclosure are applicable to, for example, bearings, speed reducers, and robots.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A bearing comprising:
an inner ring located radially outside a central axis;
an outer ring located radially outside the inner ring;
a retainer with an annular shape located between the inner ring and the outer ring; and
rollers positioned at intervals in a circumferential direction by the retainer between the inner ring and the outer ring; wherein
the retainer includes:
column portions located between adjacent pairs of the rollers; and
a flange portion connecting end portions on one axial side of the column portions in a circumferential direction;
the flange portion extends radially inside from an end portion on one axial side of the column portions;
a radial center of the column portions is located radially outside a radial center of the rollers in a transverse plane passing through the radial center of the rollers and orthogonal to the central axis; and
another axial end of the flange portion is located on another axial side with respect to one axial end of the rollers.

2. The bearing according to claim 1, wherein in the transverse plane, a radially inner end of the column portions is located radially outside a radial center of the rollers.

3. The bearing according to claim 2, wherein in the transverse plane, a radially outer end of the column portions is located radially outside a radial midpoint between a radial center of the rollers and a radially outer end of the rollers.

4. The bearing according to claim 2, wherein an axial center of the flange portion is located on the another axial side with respect to the one axial end of the rollers.

5. The bearing according to claim 2, wherein
the rollers are balls; and
assuming that a diameter of the balls is $\varphi$, a number of the balls is N, and a length of a circumference connecting centers of the balls is L,
a relationship of $\varphi \times N/L > 0.92$ is satisfied.

6. The bearing according to claim 1, wherein in the transverse plane, a radially outer end of the column portions is located radially outside a radial midpoint between a radial center of the rollers and a radially outer end of the rollers.

7. The bearing according to claim 6, wherein an axial center of the flange portion is located on the another axial side with respect to the one axial end of the rollers.

8. The bearing according to claim 6, wherein
the rollers are balls; and
assuming that a diameter of the balls is $\phi$, a number of the balls is N, and a length of a circumference connecting centers of the balls is L,
a relationship of $\phi \times N/L > 0.92$ is satisfied.

9. The bearing according to claim 1, wherein an axial center of the flange portion is located on the another axial side with respect to the one axial end of the rollers.

10. The bearing according to claim 9, wherein
the rollers are balls; and
assuming that a diameter of the balls is $\phi$, a number of the balls is N, and a length of a circumference connecting centers of the balls is L,
a relationship of $\phi \times N/L > 0.92$ is satisfied.

11. The bearing according to claim 9, wherein
the column portions are inclined with respect to an axial direction; and
an end portion on the one axial side of the column portions is located radially inside an end portion on another axial side of the column portions.

12. The bearing according to claim 1, wherein
the inner ring includes a groove that is recessed radially inside from a radially outside surface and extends in a circumferential direction; and
a radially inner end portion of the flange portion is accommodated in the groove.

13. The bearing according to claim 1, wherein the outer ring includes:
a wall portion located radially outside the rollers and extending in an axial direction; and
an annular portion located on one axial side of the rollers and extending in a radial direction;
the annular portion includes an annular first recess recessed toward one axial side from a surface on the another axial side; and a portion of the flange portion is accommodated in the first recess.

14. The bearing according to claim 13, wherein the annular portion includes an annular second recess located radially inside the first recess and recessed toward the one axial side from the first recess.

15. The bearing according to claim 14, wherein
the flange portion includes:
an outer flange portion axially opposing the first recess; and
an inner flange portion axially opposing the second recess;
a surface on one axial side of the inner flange portion is located on one axial side with respect to a surface on one axial side of the outer flange portion; and
a surface on another axial side of the inner flange portion is located on one axial side with respect to a surface on another axial side of the outer flange portion.

16. The bearing according to claim 1, wherein
the rollers are balls; and
assuming that a diameter of the balls is $\phi$, a number of the balls is N, and a length of a circumference connecting centers of the balls is L,
a relationship of $\phi \times N/L > 0.92$ is satisfied.

17. The bearing according to claim 1, wherein the retainer further includes a connecting portion connecting end portions of the column portions on another axial side in a circumferential direction.

18. The bearing according to claim 1, wherein
the column portions are inclined with respect to an axial direction; and
an end portion on the one axial side of the column portions is located radially inside an end portion on another axial side of the column portions.

19. A speed reducer comprising the bearing according to claim 1.

20. A robot comprising the speed reducer according to claim 19.

* * * * *